United States Patent [19]

Furuta et al.

[11] Patent Number: 5,278,254

[45] Date of Patent: Jan. 11, 1994

[54] LIQUID CRYSTALLINE POLYESTER RESIN COMPOSITION CONTAINING POLYPHENYLENE ETHER MODIFIED WITH AMINE

[75] Inventors: Motonobu Furuta, Chiba; Takanari Yamaguchi; Ichiki Murase, both of Tsukuba, all of Japan

[73] Assignee: Sumitomo Chemical Company, Limited, Osaka, Japan

[21] Appl. No.: 974,277

[22] Filed: Nov. 10, 1992

[30] Foreign Application Priority Data

Nov. 11, 1991 [JP] Japan ................................. 3-294509
Jan. 29, 1992 [JP] Japan ................................. 4-013757

[51] Int. Cl.$^5$ ...................... C08G 65/48; C08L 67/00; C08L 71/12
[52] U.S. Cl. ........................ 525/397; 524/80; 524/81; 524/601; 524/611; 525/390; 525/391; 525/392
[58] Field of Search ............ 525/397, 391, 392, 390; 524/601, 611, 372, 80, 81

[56] References Cited

U.S. PATENT DOCUMENTS 5,096,967  3/1992  Brown et al. .................. 528/397

FOREIGN PATENT DOCUMENTS 0030417 11/1980 European Pat. Off. .
0257586  8/1987 European Pat. Off. .
0369814 11/1989 European Pat. Off. .
0438128  1/1991 European Pat. Off. .
2097555  2/1993 Japan .
8700540  7/1986 World Int. Prop. O. .
8800605  7/1987 World Int. Prop. O. .

OTHER PUBLICATIONS

Polyester–Poly(Phenylene Oxide) Blends, *Blends of Thermotropic Polyester with Poly(phenylene Oxide)*, pp. 2923–2932.
Database WPIL Week 9236, Derwent Publications Ltd., London, GB; AN 92-295618 & JP-A-4 202 461 (Nippon GE Plastics KK) Jul. 23, 1992.

*Primary Examiner*—Harold D. Anderson
*Attorney, Agent, or Firm*—Birch, Stewart, Kolasch & Birch

[57] ABSTRACT

A liquid crystalline polyester resin composition containing (A) a polyphenylene ether which is modified with at least one amine selected from the group consisting of primary amines and secondary amines; (B) a liquid crystalline polyester; and optionally (C) at least one oil selected from the group consisting of white oil and phenyl ether type oils, which composition has improved moldability and provides a molded article having improved weld strength while maintaining good heat resistance and mechanical properties of the liquid crystalline polyester.

20 Claims, 1 Drawing Sheet

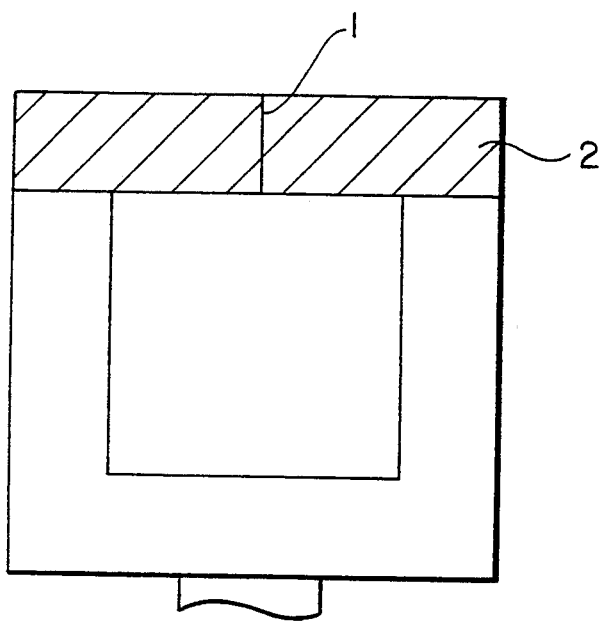

LIQUID CRYSTALLINE POLYESTER RESIN COMPOSITION CONTAINING POLYPHENYLENE ETHER MODIFIED WITH AMINE

BACKGROUND OF THE INVENTION

1. Field of the Invention

The present invention relates to a novel liquid crystalline polyester resin composition which can be formed in a molded article by injection or extrusion molding and has good heat resistance, moldability and mechanical properties, in particular, impact resistance.

2. Description of the Related Art

Since molecules of a liquid crystalline polyester are stiffer than those of a crystalline polyester such as polyethylene terephthalate or polybutylene terephthalate, they do not tangle each other in a molten state and form a polydomain having a liquid crystalline state. Then, molecule chains of the liquid crystalline polyester are strongly orientated in a flow direction under low shear and it is called as a "thermotropic liquid crystalline polymer". Because of such specific behavior, the liquid crystalline polyester has excellent melt flow characteristics and can easily provide a molded article having a thin wall of, for example, 0.2 to 0.5 mm. In addition, the molded article is characterized in high strength and high stiffness. However, the liquid crystalline polyester has some drawbacks such as extremely large anisotropy and considerably low weld strength. Further, since the liquid crystalline polyester has a high molding temperature, its application is limited. It is also a problem that a liquid crystalline polyester is expensive in general.

Accordingly, it is highly desired commercially to provide a liquid crystalline polyester resin composition which has improved weld strength and is cheap while maintaining good heat resistance and mechanical properties of the liquid crystalline polyester.

EP-A-030 417 discloses a resin composition comprising a melt-processable polymer and a polymer which forms an anisotropic melt and describes that the addition of the polymer which forms an anisotropic melt to the melt-processable polymer improves the processability of the latter. For example, the addition of a liquid crystalline polyester to a mixture of polyphenylene ether and polystyrene is disclosed.

Japanese Patent Kokai Publication No. 97555/1990 discloses a resin composition comprising a liquid crystalline polyester and various polyarylene oxides which improve heat resistance in soldering.

While a composition comprising the liquid crystalline polyester having a high molding temperature and an amorphous crystalline polymer having a lower molding temperature such as polyphenylene ether may improve the melt processability, it will provide a molded article with deteriorated appearance due to thermal decomposition of the amorphous polymer caused by high temperature in the molding step. In addition, such composition has insufficient heat resistance, mechanical properties or impact strength.

SUMMARY OF THE INVENTION

An object of the present invention is to provide a liquid crystalline polyester resin composition which is cheap, has improved processability and can provide a molded article with improved weld strength while maintaining good heat resistance and mechanical properties of the liquid crystalline polyester.

According to a first aspect of the present invention, there is provided a liquid crystalline polyester resin composition comprising (A) 1 to 75 % by weight of a polyphenylene ether which is modified with at least one amine selected from the group consisting of primary amines and secondary amines, and (B) 99 to 25 % by weight of a liquid crystalline polyester.

According to a second aspect of the present invention, there is provided a liquid crystalline polyester resin composition comprising (A) 1 to 75 % by weight of a polyphenylene ether which is modified with at least one amine selected from the group consisting of primary amines and secondary amines (B) 99 to 25 % by weight of a liquid crystalline polyester, and (C) at least one oil selected from the group consisting of white oil and phenyl ether type oils wherein an amount of said at least one oil is from 0.1 to 30 parts by weight per 100 parts by weight of the total amount of the modified polyphenylene ether (A) and the liquid crystalline polyester (B).

In a preferred embodiment, the modified polyphenylene ether (A) forms a dispersed phase while the liquid crystalline polymer forms a continuous phase.

BRIEF DESCRIPTION OF THE DRAWING

FIGURE is a plan view of a specimen for use in the measurement of the physical properties in Examples.

DETAILED DESCRIPTION OF THE INVENTION

In the present invention, a polyphenylene ether which is a raw material of the modified polyphenylene ether (A) is, in general, prepared by oxidative polymerization of a phenol compound of formula:

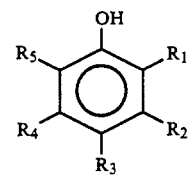

(I)

wherein $R_1$, $R_2$, $R_3$, $R_4$ and $R_5$ are independently a hydrogen atom, a halogen atom, a $C_1$-$C_6$ hydrocarbon group or a $C_1$-$C_8$ substituted hydrocarbon group, provided that at least one of them is a hydrogen atom and at least one of them is not a hydrogen atom, with oxygen or an oxygen-containing gas in the presence of an oxidative coupling catalyst.

Specific examples of $R_1$, $R_2$, $R_3$, $R_4$ and $R_5$ are independently a hydrogen atom, a chlorine atom, a bromine atom, a fluorine atom, an iodine atom, a methyl group, an ethyl group, n- or isopropyl, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, an allyl group, and the like.

Specific examples of the phenol compound (I) are o- or m-cresol, 2,6-, 2,5- or 3,5-dimethylphenol, 2-methyl-6-phenylphenol, 2,6-diphenylphenol, 2,6-diethylphenol, 2-methyl-6-ethylphenol, 2,3,5- or 2,3,6-trimethylphenol, 3-methyl-6-tert.-butylphenol, thymol, 2-methyl-6-allylphenol, and the like.

Among them, 2,6-dimethylphenol, 2,6-diphenylphenol, 3-methyl 6-tert -butylphenol and, 2-methyl-6-allyl phenol are preferred. In particular, 2,6-dimethylphenol is preferred.

Preferred examples of the polyphenylene ether to be used as the raw material of the modified polyphenylene ether (A) are a polymer of 2,6-dimethylphenol or 2,6-diphenylphenol, a copolymer of a major amount of 2,6-dimethylphenol and a minor amount of 3-methyl-6-tert.-butylphenol or 2,3,6-trimethylphenol. Among them, a polymer of 2,6-dimethylphenol is particularly preferred.

Further, as the polyphenylene ether to be used as the raw material of the modified polyphenylene ether (A), a copolymer of the phenol compound (I) with a phenyl compound other than the phenol compound (I) may be used. Examples of the other phenol compound are bisphenol A, tetrabromobisphenol A, resorcin, hydroquinone and a polyhydric aromatic compound such as a novolak resin, etc.

The oxidative coupling catalyst is not limited and any catalyst which initiates the oxidative polymerization can be used. Typical examples of the oxidative coupling catalyst are a catalyst comprising copper (I) chloride and a catalyst comprising a manganese (II) salt.

It is known that a polyphenylene ether prepared by oxidative polymerization at a temperature higher than 40° C. (high temperature polymerization) and that prepared by oxidative polymerization at a temperature lower than 40° C. (low temperature polymerization) have different properties. In the present invention, both polyphenylene ethers can be used.

To prepare the modified polyphenylene ether (A) used in the resin composition of the present invention, at least one amine selected from the group consisting of primary amines and secondary amines is reacted with the unmodified polyphenylene ether.

As the primary amine, stearyamine may be used. Further, as the primary amine, a styrene monomer having an amino group may be used. As the secondary amine, a styrene monomer having a secondary amine group may be used.

In addition to the amine, a styrene monomer other than the primary or secondary amine may be used in combination in the preparation of the modified polyphenylene ether (A).

Preferably, the primary or secondary amine contains a functional group which is reactive with the polyphenylene ether in addition to the amino or secondary amine group. Examples of the functional group reactive with the polyphenylene ether are polymerizable groups such as carbon-carbon double or triple bonds.

Each molecule of the monomer may be reacted with the polyphenylene ether or a polymer of two or more molecules of the monomer may be grafted with the polyphenylene ether.

Specific examples of the primary amine are allylamine, allylaniline, N-acryloylamine, N-methacryloylamine, N-phenyl N-methacryloylamine and the like. Specific examples of the secondary amine are diallylamine, vinylimidazole and the like. Among them, allylamine, diallylamine and vinylimidazole are preferred.

The primary and secondary amines are used independently or a mixture thereof.

Examples of the styrene monomer having the amino group are aminostyrene, aminomethylstyrene and the like. They include their isomers. The styrene monomers having the amino group are used independently or as a mixture thereof.

In addition to the amine, a styrene monomer other than the amines may be used.

The styrene monomer other than the primary or secondary amine is represented by the formula:

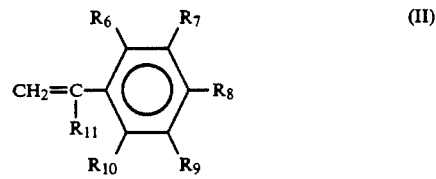

wherein $R_6$, $R_7$, $R_8$, $R_9$ and $R_{10}$ are independently a hydrogen atom, a halogen atom, a $C_1$–$C_6$ hydrocarbon group, a $C_1$–$C_8$ substituted hydrocarbon group, a $C_1$–$C_6$ hydrocarbonoxy group or a $C_1$–$C_8$ substituted hydrocarbonoxy group, and $R_{11}$ is a $C_1$–$C_4$ alkyl group.

Specific examples of $R_6$, $R_7$, $R_8$, $R_9$ and $R_{10}$ are hydrogen atom; a halogen atom such as a chlorine atom, a bromine atom and an iodine atom; a hydrocarbon group such as a methyl group, an ethyl group, a propyl group, a vinyl group, an allyl group, a benzyl group and a methylbenzyl group; a substituted hydrocarbon group such as a chloromethyl group and a bromomethyl group; and a substituted or unsubstituted hydrocarbonoxy group such as a methoxy group, an ethoxy group, a phenoxy group and a monochloromethoxy group. Specific examples of $R_{11}$ are a hydrogen atom and a lower alkyl group such as a methyl group and an ethyl group.

Specific examples of the styrene monomer (II) are styrene, 2,4-dichlorostyrene, p-methoxystyrene, p-methylstyrene, p-phenylstyrene, p-divinylbenzene, p-(chloromethoxy)styrene, α-methylstyrene, o-methyl-α-methylstyrene, m-methyl-α-methylstyrene, p-methyl-α-methylstyrene, p-methoxy-α-methylstyrene, and the like. They may be used independently or as a mixture thereof. Among them, styrene is preferred.

In the preparation of the modified polyphenylene ether (A), when the styrene monomer is used, a small amount of an additional monomer which is copolymerizable with the styrene monomer may be used in addition to the above described monomer or monomer mixture.

Specific examples of the additional monomer copolymerizable with the styrene monomer are acrylonitrile, methacrylonitrile, fumaric acid, maleic acid, maleic anhydride, alkyl acrylates, alkyl methacrylates, glycidyl acrylate, glycidyl methacrylate, vinyl acetate, 2-vinylnaphthalene, vinylcarbazole, and the like. Their derivatives may be used. They may be used independently or as a mixture thereof.

There is no limitation on a method for the preparation of the modified polyphenylene ether (A) and any of conventional methods may be used. Preferably, the polyphenylene ether is modified by graft copolymerization to obtain the modified polyphenylene ether. For example, the unmodified polyphenylene ether, the primary or secondary amine and optionally the additional monomer are melt kneaded or suspension reacted. In such method, a radical initiator may be used.

Any radical initiator can be used without limitation. Examples of the radical initiator are azo compounds such as 2,2'-azobisisobutyronitrile and those disclosed in Japanese Patent Kokai Publication No. 160856/1990.

If necessary, the modified polyphenylene ether (A) may contain an unmodified polyphenylene ether, styrenegrafted polyphenylene ether or polystyrene.

Preferably, the modified polyphenylene ether (A) or the raw material polyphenylene ether has a reduced viscosity $\eta_{sp}/c$ of 0.30 to 0.65 dl/g when measured in chloroform at a concentration of 0.5 g/dl at 25° C. When the reduced viscosity is smaller than 0.30 dl/g, heat resistance of the resin composition greatly decreases. When the reduced viscosity exceeds 0.65 dl/g, the resin composition has deteriorated molding processability unpreferably.

The liquid crystalline polyester (B) is a polyester called as a thermotropic liquid crystalline polymer.

Specific examples of the liquid crystalline polyether (B) are (1) a polymer comprising an aromatic dicarboxylic acid, an aromatic diol and an aromatic hydroxycarboxylic acid, (2) a polymer comprising two or more different aromatic hydroxycarboxylic acids, (3) a polymer comprising an aromatic dicarboxylic acid and an aromatic diol having a substituent on its aromatic ring, and (4) a polymer comprising a polyester (e.g. polyethylene terephthalate) to which an aromatic hydroxycarboxylic acid is reacted.

These polymers form an anisotropic melt at a temperature not higher than 400° C. In place of the aromatic carboxylic acid, the aromatic diol and the aromatic hydroxycarboxylic acid, their ester-forming derivatives may be used.

Specific examples of repeating units which constitute the liquid crystalline polyester are as follows:

Repeating units derived from aromatic dicarboxylic acids

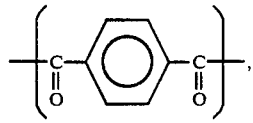

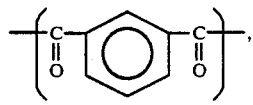

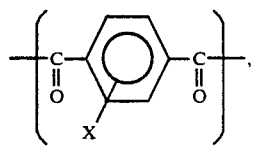

wherein X is a halogen atom, an alkyl group or an aryl group,

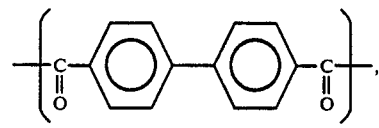

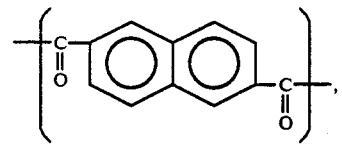

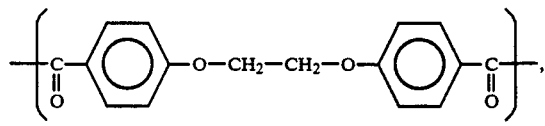

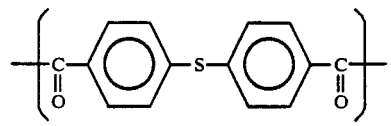

Repeating units derived from aromatic diols

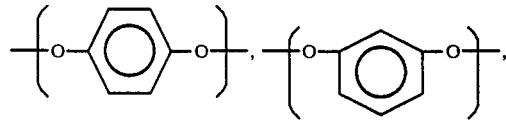

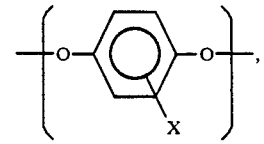

wherein X is the same as defined above,

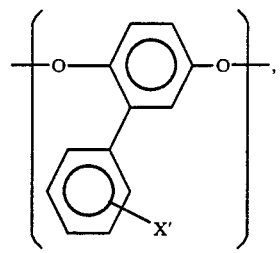

wherein X' is a halogen atom or an alkyl group.

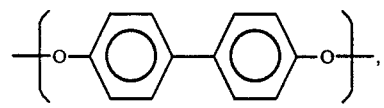

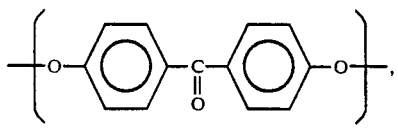

-continued

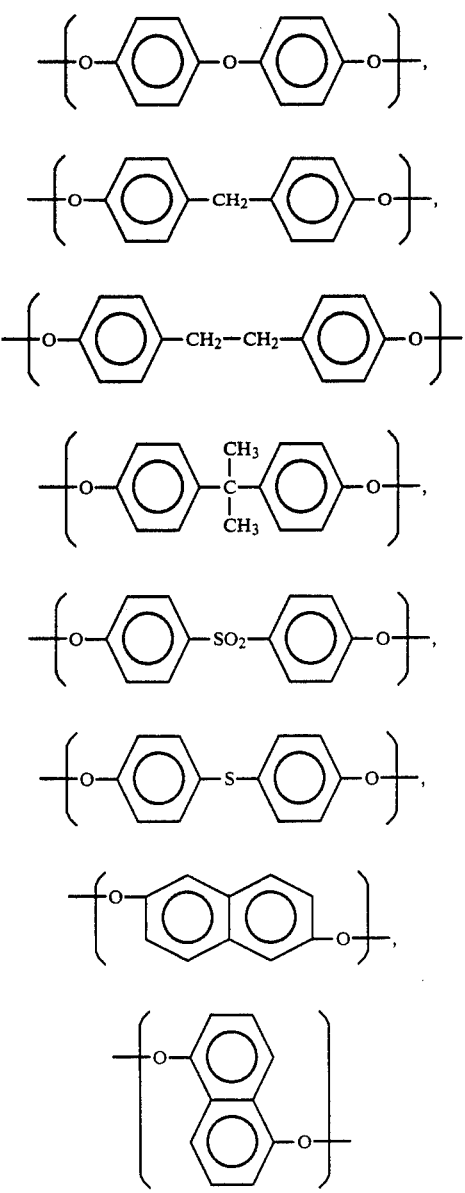

Repeating units derived from aromatic hydroxycarboxylic acids

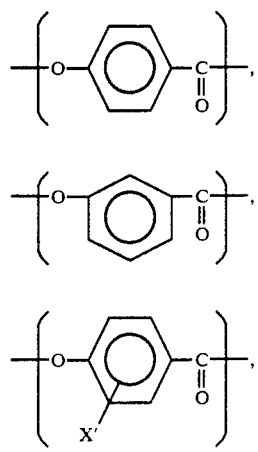

wherein X' is the same as defined above,

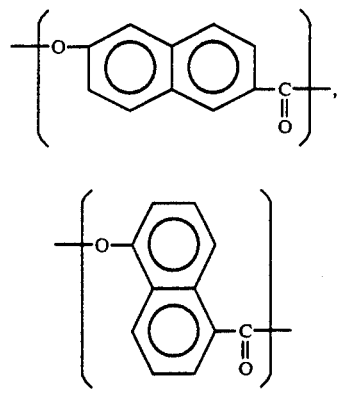

In view of a balance among the heat resistance, the mechanical properties and the processability, a liquid crystalline polyester preferably comprises the repeating units of the formula:

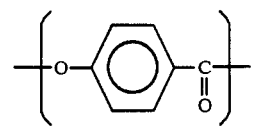

and more concretely comprises one of the repeating unit combinations (i), (ii), (iii), (iv) and (v):

(i)

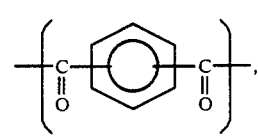

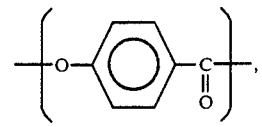

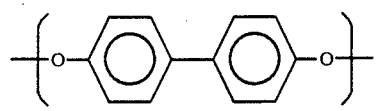

(ii)

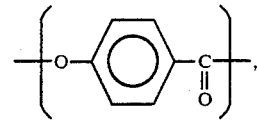

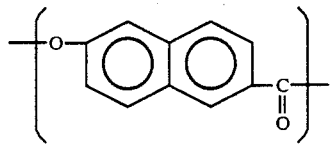

(iii)

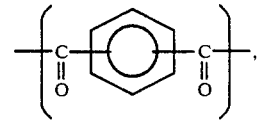

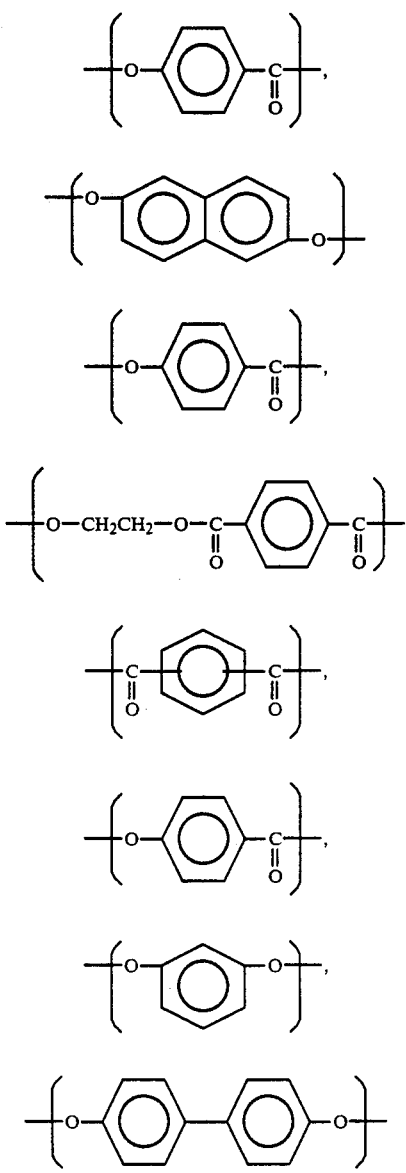

The liquid crystalline polyesters (i), (ii), (iii) and (iv) are disclosed in Japanese Patent Publication Nos. 47870/1972, 3888/1988, 3891/1988 and 18016/1981, respectively.

There is no limitation on a method for preparing the liquid crystalline polyester resin composition of the present invention and any one of conventional methods may be applied. For example, the components are mixed in the form of solution, and then a solvent is evaporated off or the solution mixture is poured in a non-solvent to precipitate the resin composition. From the industrial view point, preferably the components are kneaded in a molten state. For melt kneading, a conventional used kneading apparatus such as a single or a two screw extruder can be used. In particular, a two screw extruder is preferred.

For example, in kneading, the unmodified polyphenylene ether and the amine are supplied in a first feeder together with an organic peroxide and the liquid crystalline polyester is supplied in a second feeder to prepare the liquid crystalline polyester resin composition in one kneading step.

Before kneading, the components may be homogeneously mixed with a mixer such as a tumbling mixer or a Henschel mixer. In some cases, without premixing, each of the components can be quantitatively supplied directly to the kneading apparatus.

The kneaded resin composition is molded by a conventional molding process such as injection molding, extrusion molding and the like. Without kneading, the molded article can be produced directly from the components by dry blending the components in the course of injection or extrusion molding and kneading them in the melt processing step to form the resin composition.

When the resin composition comprises the modified polyphenylene ether (A) and the liquid crystalline polyether (B) in the specific ratio, the desired resin composition is obtained. That is the amounts of the modified polyphenylene ether (A) and the liquid crystalline polyether are 1 to 75 % by weight and 99 to 25 % by weight, respectively.

When the amount of the modified polyphenylene ether (A) is less than 1 % by weight, a flow temperature of the resin composition is too high and there is no advantage in its cost. When the amount of the modified polyphenylene ether (A) exceeds 75 % by weight, the resin composition has insufficient heat resistance or strength.

The resin composition of the present invention may further comprise at least one oil (C) selected from the group consisting of white oil and the phenyl ether type oils. Thereby, the impact resistance and moldability of the resin composition are further improved.

Preferably, the modified polyphenylene ether (A) forms the dispersed phase while the liquid crystalline polyester (B) forms the continuous phase in the resin composition. In such case, the resin composition has more improved chemical resistance, heat resistance, mechanical properties, etc.

The term "white oil" is intended to mean an petroleum fraction which is highly purified and is a mixture of paraffin hydrocarbons and naphthene hydrocarbons, which mixture does not contain impurities such as other aromatic compounds, acids, sulfur-containing compounds and the like.

The term "phenyl ether type oil" is intended to mean a compound having benzene rings which are bonded with an ether linkage. Preferred examples of the phenyl ether type oil are compounds of the following formulas (III), (IV) and (V):

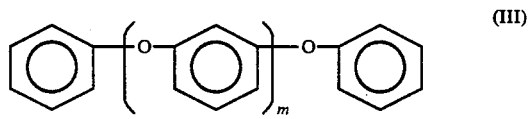
(III)

wherein m is an integer of 0 to 3, and each benzene ring may be independently substituted with one or two $C_1$–$C_6$ alkyl groups, provided that the total number of the alkyl groups in the formula is preferably 4 or less.

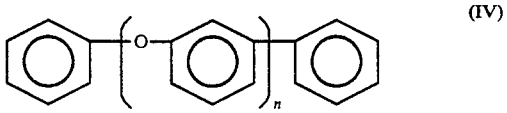
(IV)

wherein n is an integer of 1 to 3, and each benzene ring may be independently substituted with one or two $C_1$-$C_6$ alkyl groups, provided that the total number of the alkyl groups in the formula is preferably 4 or less.

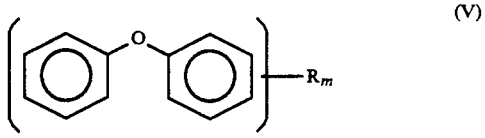
(V)

wherein m is 2 in general, but compounds in which m is from to 10 may be contained as by-products, R groups may be present at any position on the two benzene rings and represented by the formula:

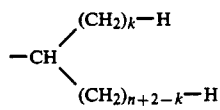

in which n is an odd number of 1 to 15, and k is an integer of 0 to (n+2).

Specific examples of the phenyl ether type oils are alkyldiphenyl ether, dialkyltetraphenyl ether, pentaphenyl ether, tetraphenyl ether, and the like.

As the oil (C), the white oil and the phenyl ether type oil having a viscosity (SUS Second) of 40 to 400 at 37.8° C. according to JIS K-2283 are preferably used. When the viscosity of the oil is outside this range, the resin composition may have insufficient melt flowability or decreased mechanical properties.

Various white oils and phenyl ether oils are commercially sold. Examples of the commercially available oils are High White 120 (trade name of Nippon Oil Co., Ltd.); Kaydol, Gloria, Protol, Elball, Brandol, Carnation, Clearol, Orzol, Britol, Ludol and Benol (trade names of Witco Chemicals Co., Ltd.); Crystol (trade name of Esso Standard Oil Co., Ltd.); Unico (trade name of Union Sekiyu Co., Ltd.); Daphene (trade name of Idemitsu Petrochemistry Co., Ltd.); Moresco White, Smoil, Lambus, Silcol, Morescobioless, Moresco Hilube, S-3101, S-3102, S-3103, S-3105 and S-2130 (trade names of Matsumura Oil Research Corp.); and the like.

When the oil (C) is contained, its amount is from 0.1 to 30 parts by weight per 100 parts by weight of the total weight of the modified polyphenylene ether (A) and the liquid crystalline polyether (B).

When the amount of the oil (C) is less than 0.1 parts by weight, effects achieved by the oil (C) are not recognized. When the amount of the oil (C) is larger than 30 parts by weight, the molded article may suffer from peeling blister or have insufficient heat resistance or strength.

The resin composition comprising the polyphenylene ether (A), the liquid crystalline polyester (B) and the oil (C) can be prepared by the same method as described above.

There is no limitation on the sequence of mixing or kneading three components (A), (B) and (C). For example, the oil (C) is added when the components (A) and (B) are kneaded. Alternatively, the oil (C) is added to either one of the components (A) and (B) and then kneaded with the remaining component.

If desired, the resin composition of the present invention may contain an inorganic filler. Examples of the inorganic filler are calcium carbonate, talc, clay, silica, magnesium carbonate, barium sulfate, titanium oxide, alumina, gypsum, glass fiber, carbon fiber, alumina fiber, silica alumina fiber, aluminum borate whisker, potassium titanate fiber, and the like.

If necessary, the resin composition of the present invention may further contain various additives such as an organic filler, an antioxidant, a heat stabilizer, a light stabilizer, a flame retardant, a lubricant, an antistatic agent, an organic or inorganic colorant, a rust preventive, a crosslinking agent, a blowing agent, a fluorescent agent, a surface smoothing agent, a surface gloss improver, a mold release agent (e.g. a fluororesin) and the like.

The additive may be added to the resin composition in the preparation step of the composition or the subsequent molding step.

The liquid crystalline resin composition of the present invention is excellent in heat resistance, mechanical properties, impact resistance, moldability, thin wall properties, appearance and gloss. Utilizing such excellent characteristics, the liquid crystalline resin composition of the present invention is molded by injection or extrusion molding to produce a molded article, a sheet, a tube, a film, a fiber and a laminate, and used as a coating material.

PREFERRED EMBODIMENTS OF THE INVENTION

(I) Measurement of Physical Properties

The physical properties are measured with a specimen which is produced by injection molding the composition using an injection molding machine (IS 150E-V type manufactured by Toshiba Machine Co., Ltd.) at a molding temperature of 300° to 330° C. and a mold temperature of 110° to 130° C.

A reduced viscosity $\eta_{sp}/c$ of the polyphenylene ether is measured with a 0.5 g/dl solution of the polyphenylene ether in chloroform at 25° C.

Weld strength and non-weld strength are measured as follows:

From the resin composition, a specimen shown in FIGURE which has a thickness of 3 mm, an external dimension of 64 mm and an internal dimension of 38 mm is molded and then a hatched part 2 including the weld line 1 (64 mm × 13 mm) is cut out and its flexural strength is measured with a span distance of 40 mm and a flexing speed of 2 mm/min.

From a specimen having the same shape, a non-weld part (64 mm × 13 mm) is cut out and its flexural strength is measured in the same manner as above.

Tensile strength and a thermal distortion temperature under load (TDUL) are measured according to ASTM D638 and ASTM D648 (under load of 18.6 kg), respectively with an ASTM No. 4 bumbbell specimen and a test piece for TDUL measurement (127 mm in length, 12.7 mm in width, 6.4 mm in thickness) which are formed from the resin composition.

Izod impact strength is measured with a specimen having a thickness of 6.4 mm without notch according to JIS K-7110 at room temperature.

Flexural strength is measured with a specimen having a thickness of 6.4 mm according to ASTM D790.

Appearance of an injection molded article is evaluated according to following criteria:
  O: Beautiful appearance and no or little change of color tone.

X: Change of color tone being found on the surface of the molded article

A morphology of the composition is observed as follows:

The injection molded article is sliced by using a microtome and etched with carbon tetrachloride. Then, the etched specimen is observed with a scanning electron microscope and classified as follows:

A: The polyphenylene ether part (modified polyphenylene ether and unmodified polyphenylene ether) forms the dispersed phase, while the liquid crystalline polyester part forms the continuous phase B: The polyphenylene ether part forms the continuous phase, while the liquid crystalline polyether forms the dispersed phase.

A flow temperature is measured using a Koka type flow tester (CFT-500 type manufactured by Shimadzu Corp.) by extruding a heat-molten resin which is being heated at a heating rate of 4° C./min. under a load of 100 kg/cm$^2$ from a nozzle of 1 mm in inner diameter and 10 mm in length. A temperature at which the melt viscosity reaches 48,000 poise is determined as a flow temperature. The lower flow temperature means better flowability.

Tensile strength of a thin wall molded article is measured with a dumbbell shape specimen having a thickness of 0.5 mm, a length of 75 mm and a necked portion width of 5 mm molded from the resin composition.

(II) Materials Used (1) Modified Polyphenylene Ether (A)

(i) A polyphenylene ether having $\eta_{sp}/c$ of 0.41 (manufactured by Nippon Polyether Co., Ltd.) (100 parts by weight), p-aminostyrene (1.9 parts by weight), a radical initiator (Perbutyl PV (trade name) manufactured by Miyoshi Fat and Oil Co., Ltd.) and a stabilizer were mixed in a Henschel mixer and pelletized using a twin screw extruder (manufacture by Toshiba Machine Co., Ltd.) at a cylinder temperature of 270° C. with venting to obtain a modified polyphenylene ether, which will be referred to as "A-1".

(ii) A polyphenylene ether having $\eta_{sp}/c$ of 0.58 (manufactured by Nippon Polyether Co., Ltd.) (100 parts by weight), diallylamine (2.4 parts by weight), styrene (0.7 part by weight), a radical initiator (Perbutyl PV (trade name) manufactured by Miyoshi Fat and Oil Co., Ltd.) and a stabilizer were mixed in a Henschel mixer and pelletized using a twin screw extruder (manufacture by Toshiba Machine Co., Ltd.) at a cylinder temperature of 280° C. with venting to obtain a modified polyphenylene ether, which will be referred to as "A-2".

(iii) A polyphenylene ether having $\eta_{sp}/c$ of 0.35 (manufactured by Nippon Polyether Co., Ltd.) (100 parts by weight), allylamine (5.7 parts by weight), styrene (1.9 parts by weight), methyl methacrylate (1.2 parts by weight), water (400 parts by weight), a radical initiator (Perbutyl PV (trade name) manufactured by Miyoshi Fat and Oil Co., Ltd.) and a dispersant (Metrose 90SH-100 manufactured by Shinetsu Chemical Co., Ltd.) were charged in an autoclave and reacted in a nitrogen atmosphere at 100° C. for 2 hours. The produced composition was recovered and dried to obtain a modified polyphenylene ether, which will be referred to as "A-3".

(iv) A polyphenylene ether having $\eta_{sp}/c$ of 0.35 (manufactured by Nippon Polyether Co., Ltd.) (100 parts by weight), vinylimidazole (1.9 parts by weight), maleic anhydride (1.1 parts by weight), styrene (0.8 part by weight), a radical initiator (Perbutyl PV (trade name) manufactured by Miyoshi Fat and Oil Co., Ltd.) and a stabilizer were mixed in a Henschel mixer and pelletized using a twin screw extruder (manufacture by Toshiba Machine Co., Ltd.) at a cylinder temperature of 280° C. with venting to obtain a modified polyphenylene ether, which will be referred to as "A-4".

(v) A polyphenylene ether having $\eta_{sp}/c$ of 0.41 (manufactured by Nippon Polyether Co., Ltd.) (100 parts by weight), diallylamine (2.3 parts by weight) and a stabilizer were mixed in a Henschel mixer and pelletized using a twin screw extruder (manufacture by Toshiba Machine Co., Ltd.) at a cylinder temperature of 290° C. with venting to obtain a modified polyphenylene ether, which will be referred to as "A-5".

(vi) A polyphenylene ether having $\eta_{sp}/c$ of 0.49 (manufactured by Nippon Polyether Co., Ltd.) (100 parts by weight), stearylamine (2 parts by weight), Kayahekisa AD40C (manufactured by Kayaku Nouley Co., Ltd.) (1 part by weight) and a stabilizer were mixed in a Henschel mixer and pelletized using a twin screw extruder (manufacture by Toshiba Machine Co., Ltd.) at a cylinder temperature of 295° C. to obtain a modified polyphenylene ether, which will be referred to as "A 6".

(vii) A polyphenylene ether having $\eta_{sp}/c$ of 0.49 (manufactured by Nippon Polyether Co., Ltd.) (100 parts by weight), p-aminostyrene (1.5 parts by weight), a radical initiator (Perbutyl PV (trade name) manufactured by Miyoshi Fat and Oil Co., Ltd.) (0.4 part by weight) and a stabilizer (IRGANOX 3114 (trade name) manufactured by Ciba-Geigy) were mixed in a Henschel mixer and pelletized using a twin screw extruder (TEM-50 type manufacture by Toshiba Machine Co., Ltd.) at a cylinder temperature of 277° C. with venting to obtain a modified polyphenylene ether, which will be referred to as "AA-1".

(viii) A polyphenylene ether having $\eta_{sp}/c$ of 0.37 (manufactured by Nippon Polyether Co., Ltd.) (100 parts by weight), diallylamine (3.2 parts by weight), styrene (0.5 part by weight), a radical initiator (Sanperox TO (trade name) manufactured by Sanken Kako Co., Ltd.) (0.2 part by weight) and a stabilizer (IRGANOX 3114 (trade name) manufactured by Ciba-Geigy) were mixed in a Henschel mixer and pelletized using a twin screw extruder (TEM-50 type manufactured by Toshiba Machine Co., Ltd.) at a cylinder temperature of 280° C. with venting to obtain a modified polyphenylene ether, which will be referred to as "AA-2".

(2) Liquid Crystalline Polyester (B)

(i) p-Acetoxybenzoic acid (10.8 kg, 60 moles), terephthalic acid (2.49 kg, 15 moles), isophthalic acid (0.83 kg, 5 moles) and 4,4'-diacetoxydiphenyl (5.45 kg, 20.2 moles) were charged in a polymerization vessel equipped with a comb-shape agitator, heated to 330° C. and polymerized at the same temperature for one hour in a nitrogen atmosphere with vigorous stirring while removing by-produced acetic acid from the vessel. Then, the reaction system was gradually cooled to 200° C. and the obtained polymer was discharged from the vessel. The obtained polymer was comminuted with a hammer mill (manufactured by Hosokawa Micron Co., Ltd.) to obtain particles having a particle size of 2.5 mm or less. The particles were further processed in a rotary kiln at 280° C. for 3 hours in a nitrogen atmosphere to obtain a particulate all aromatic polymer having a flow temperature of 324° C. and comprising the following repeating units:

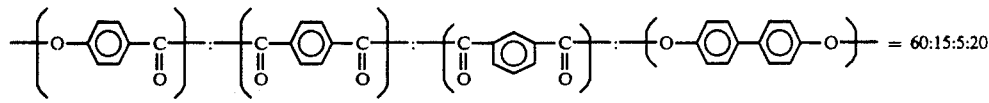

This liquid crystalline polyester will be referred to as "B-1". This polyester had optical anisotropy at a temperature of 340° C. or higher under pressure.

(ii) p-Acetoxybenzoic acid (8.1 kg, 45 moles) and 6-acetoxy-2-naphthoic acid (6.9 kg, 30 moles) were charged in a polymerization vessel equipped with a comb-shape agitator, heated up to 300° C. with stirring and polymerized at 300° C. for 30 minutes, at 320° C. for 30 minutes and then at 320° C. under reduced pressure of 8.0 torr for 2 hours while removing by-produced acetic acid from the vessel. Then, the reaction system was gradually cooled to 180° C. and the obtained polymer was discharged from the vessel. The obtained polymer was comminuted in the same manner as in the preparation of B-1 and processed in a rotary kiln at 240° C. for 5 hours in a nitrogen atmosphere to obtain a particulate all aromatic polymer having a flow temperature of 260° C. and comprising the following repeating units:

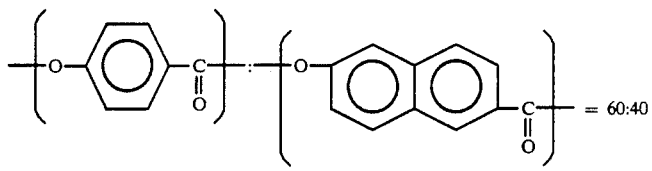

This liquid crystalline polyester will be referred to as "B-2". This polyester had optical anisotropy at a temperature of 320° C. or higher at a static condition.

(3) White Oil or Phenyl Ether Type Oil (C)

(i) Benol (trade name of a white oil manufactured by Witco Chemical Co., Ltd.) having a viscosity (SUS, 37.8° C.) of 345, which will be referred to as "C-1".

(ii) Moresco Hilube LB-100 (trade name of a phenyl ether type oil manufactured by Matsumura Oil Research Corp.) having a viscosity (SUS, 40° C.) of 100, which will be referred to as "C-2".

(iii) High White 120 (trade name of a white oil manufactured by Nippon Oil Co., Ltd.) having a viscosity (SUS, 37.8° C.) of 120, which will be referred to as "C-3".

EXAMPLES 1-9 AND COMPARATIVE EXAMPLES 1-13

The components were mixed with a stabilizer in a composition shown in Tables 1, 2 and 3 and kneaded using a twin screw extruder (PCM-30 type manufactured by Ikegai Works Co., Ltd.) at a cylinder temperature of 300° to 330° C. Then, the physical properties of each composition were measured. The results are shown in Tables 1, 2 and 3.

EXAMPLES 10-16 AND COMPARATIVE EXAMPLES 11-14

The components were mixed with a stabilizer in a composition shown in Tables 4 and 5 and kneaded using a twin screw extruder (TEM-50 type manufactured by Toshiba Machine Co., Ltd.) at a cylinder temperature of 320° to 330° C. Then, the physical properties of each composition were measured. The results are shown in Tables 4 and 5.

The liquid crystalline polyester resin composition of the present invention is excellent in various properties such as heat resistance, mechanical properties, weld strength, thin wall properties, moldability, etc. and provides a molded article with good appearance. Further, the resin composition of the present invention is economical since it contains a cheap polyphenylene ether.

TABLE 1

| Example No. | Composition (% by weight) | | | Physical properties | | | | | | |
|---|---|---|---|---|---|---|---|---|---|---|
| | Modified PPE | PPE | Liquid crystalline polyester | TDUL (°C.) | Tensile strength (kg/cm$^2$) | Flexural strength (kg/cm$^2$) | Non-weld strength (kg/cm$^2$) | Weld strength (kg/cm$^2$) | Izod impact strength (kg·cm/cm) | Appearance of molded article | Morphology |
| 1 | A-1 (10) | 0 | B-1 (90) | 253 | 1420 | 1150 | 760 | 330 | 47 | ○ | A |
| 2 | A-1 (30) | 0 | B-1 (70) | 231 | 1290 | 1070 | 790 | 460 | 42 | ○ | A |
| 3 | A-1 (40) | 0 | B-1 (60) | 198 | 970 | 930 | 590 | 290 | 28 | ○ | A |
| C. 1 | 0 | 0 | B-1 (100) | 257 | 1590 | 1280 | 820 | 210 | 52 | ○ | A |
| C. 2 | 0 | 30*[1] | B-1 (70) | 204 | 830 | 810 | 560 | 340 | 30 | X | A |
| C. 3 | A-1 (85) | 0 | B-1 (15) | 139 | 390 | 430 | 280 | 120 | 7 | X | B |

Note:
*[1] PPE having a reduced viscosity of 0.41 manufactured by Nippon Polyether Co., Ltd.

TABLE 2

| Example No. | Composition (% by weight) | | | Physical properties | | | | | | | |
|---|---|---|---|---|---|---|---|---|---|---|---|
| | Modified PPE | PPE | Liquid crystal-line polyester | TDUL (°C.) | Tensile strength (kg/cm²) | Flexural strength (kg/cm²) | Non-weld strength (kg/cm²) | Weld strength (kg/cm²) | Izod impact strength (kg · cm/cm) | Appearance of molded article | Morphology |
| 4 | A-2 (10) | 5*1 | B-1 (85) | 242 | 1370 | 1230 | 700 | 380 | 46 | ○ | A |
| C. 4 | 0 | 15*1 | B-1 (85) | 221 | 1020 | 1100 | 610 | 220 | 39 | X | A |
| 5 | A-3 (40) | 0 | B-1 (60) | 194 | 950 | 870 | 590 | 350 | 31 | ○ | A |
| C. 5 | 0 | 40*2 | B-1 (60) | 180 | 570 | 610 | 270 | 160 | 17 | X | A |
| 6 | A-4 (42) | 8*2 | B-2 (50) | 163 | 1160 | 1050 | 710 | 400 | 29 | ○ | A |
| C. 6 | 0 | 50*2 | B-2 (50) | 151 | 870 | 790 | 360 | 190 | 11 | X | A |
| C. 7 | 0 | 0 | B-2 (100) | 180 | 1720 | 1250 | 580 | 130 | 41 | ○ | A |

Note:
*1Manufactured by Nippon Polyether (a reduced viscosity of 0.58).
*2Manufactured by Nippon Polyether (a reduced viscosity of 0.35).

TABLE 3

| Example No. | Composition (% by weight) | | | Physical properties | | | | | | | | |
|---|---|---|---|---|---|---|---|---|---|---|---|---|
| | Modified PPE | PPE | Liquid crystal-line polyester | TDUL (°C.) | Tensile strength (kg/cm²) | Flexural strength (kg/cm²) | Non-weld strength (kg/cm²) | Weld strength (kg/cm²) | Tensile strength of thin wall (kg/cm²) | Izod impact strength (kg · cm/cm) | Appearance of molded article | Morphology |
| 7 | A-5 (20) | 0 | B-1 (80) | 240 | 1330 | 1190 | 800 | 300 | 1470 | 46 | ○ | A |
| C. 8 | 0 | 20*1 | B-1 (80) | 212 | 1030 | 930 | 570 | 210 | 1170 | 34 | X | A |
| 8 | A-5 (37) | 10*1 | B-1 (53) | 215 | 1010 | 1020 | 610 | 215 | 1230 | 27 | ○ | A |
| C. 9 | 0 | 47*1 | B-1 (53) | 192 | 470 | 540 | 520 | 160 | 960 | 9 | X | A |
| 9 | A-6 (45) | 0 | B-1 (55) | 213 | 1160 | 1080 | 590 | 330 | 1170 | 24 | ○ | A |
| C. 10 | 0 | 45*2 | B-1 (55) | 201 | 720 | 690 | 430 | 220 | 780 | 11 | X | A |

Note:
*1Manufactured by Nippon Polyether (a reduced viscosity of 0.41).
*2Manufactured by Nippon Polyether (a reduced viscosity of 0.49).

TABLE 4

| Example No. | Composition (% by weight) | | | Physical properties | | | | | | |
|---|---|---|---|---|---|---|---|---|---|---|
| | Modified PPE | Liquid crystal-line polyester | Oil | TDUL (°C.) | Tensile strength (kg/cm²) | Flexural strength (kg/cm²) | Izod impact strength (kg · cm/cm) | Flow temperature (°C.) | Appearance of molded article | Morphology |
| 10 | AA-1 (36) | B-1 (64) | C-1 (6) | 231 | 1020 | 1130 | 57 | 298 | ○ | A |
| 11 | AA-1 (36) | B-1 (64) | 0 | 238 | 1150 | 1210 | 32 | 316 | ○ | A |
| 12 | AA-2 (12) | B-1 (88) | C-2 (3) | 249 | 1760 | 1080 | (No break) | 308 | ○ | A |
| 13 | AA-2 (12) | B-1 (88) | 0 | 250 | 1800 | 1120 | 51 | 312 | ○ | A |
| C. 11 | *1 (12) | B-1 (88) | C-2 (3) | 243 | 1570 | 890 | 61 | 310 | ○ | A |
| C. 12 | *1 (12) | B-1 (88) | 0 | 236 | 1070 | 710 | 35 | 319 | ○ | A |
| 14 | AA-2 (46) *2 (6) | B-2 (48) | C-3 (11) | 142 | 770 | 670 | 53 | 268 | ○ | A |
| 15 | AA-2 (46) *2 (6) | B-2 (48) | 0 | 146 | 820 | 730 | 21 | 278 | ○ | A |
| C. 13 | *2 (52) | B-2 (48) | 0 | 136 | 590 | 510 | 12 | 263 | X | A |

*1Unmodified PPE manufactured by Nippon Polyether (a reduced viscosity of 0.49).
*2Unmodified PPE manufactured by Nippon Polyether (a reduced viscosity of 0.37).

TABLE 5

| Example No. | Composition (% by weight) | | | | Physical properties | | | | | | |
|---|---|---|---|---|---|---|---|---|---|---|---|
| | Modified PPE | Liquid crystal-line polyester | Oil | | TDUL (°C.) | Tensile strength (kg/cm²) | Flexural strength (kg/cm²) | Izod impact strength (kg · cm/cm) | Tensile strength of thin wall article (kg/cm²) | Flow temperature (°C.) | Appearance of molded article | Morphology |
| 16 | A-5 (28) | B-1 (70) | C-2 (2) | | 228 | 1300 | 1120 | 47 | 1390 | 301 | ○ | A |
| C. 14 | *1 (28) | B-1 (70) | C-2 (2) | | 203 | 1030 | 990 | 33 | 1080 | 303 | X | A |

*1Unmodified PPE manufactured by Nippon Polyether (a reduced viscosity of 0.41).

What is claimed is:

1. A liquid crystalline polyester resin composition comprising
   (A) 1 to 75 % by weight of a polyphenylene ether which is modified with at least one amine selected from the group consisting of primary amines and secondary amines, and
   (B) 99 to 25 % by weight of a liquid crystalline polyester.

2. The liquid crystalline polyester resin composition according to claim 1, wherein said polyphenylene ether (A) is modified with a styrene monomer other than the primary or secondary amine in addition to said at least one amine.

3. The liquid crystalline polyester resin composition according to claim 1, wherein said primary amine has a carbon-carbon double or triple bond.

4. The liquid crystalline polyester resin composition according to claim 1, wherein said secondary amine has a carbon-carbon double or triple bond.

5. The liquid crystalline polyester resin composition according to claim 1, wherein said primary or secondary amine is a styrene monomer having an amino or secondary amine group.

6. The liquid crystalline polyester resin composition according to claim 2, wherein said primary or secondary amine is a styrene monomer having an amino or secondary amine group.

7. The liquid crystalline polyester resin composition according to claim 1, wherein said primary amine is at least one compound selected from the group consisting of allylamine and stearylamine.

8. The liquid crystalline polyester resin composition according to claim 1, wherein said secondary amine is at least one compound selected from the group consisting of diallylamine and vinylimidazole.

9. The liquid crystalline polyester resin composition according to claim 5, wherein said styrene monomer having the amino group is at least one compound selected from the group consisting of aminostyrene and aminomethylstyrene.

10. The liquid crystalline polyester resin composition according to claim 1, which further comprises
(C) at least one oil selected from the group consisting of white oil and phenyl ether oils in an amount of 0.1 to 30 parts by weight per 100 parts by weight of the total amount of said modified polyphenylene ether (A) and said liquid crystalline polyester (B).

11. The liquid crystalline polyester resin composition according to claim 1, wherein said modified polyphenylene ether (A) forms a dispersed phase and said liquid crystalline polyester (B) forms a continuous phase.

12. The liquid crystalline polyester resin composition according to claim 10, wherein said oil (C) is at least one oil selected from white oils or phenyl ether oils which have a viscosity as measured by the Saybolt Universal Second standard of 40 to 400 at 37.8° C.

13. The liquid crystalline polyester resin composition according to claim 1, wherein said polyphenylene ether (A) which is modified is selected from the group consisting of a polymer of 2,6-dimethylphenol, a polymer of 2,6-diphenylphenol, a copolymer of 2,6-dimethylphenol and 3-methyl-6-tert.-butylphenol, and a copolymer of 2,6-dimethylphenol and 2,3,6-trimethylphenol.

14. The liquid crystalline polyester resin composition according to claim 1, wherein said polyphenylene ether (A) which is modified is 2,6-dimethylphenol.

15. The liquid crystalline polyester resin composition according to claim 1, wherein the primary amines and secondary amines are selected from the group consisting of allylamine, allylaniline, N-acryloylamine, N-methacryloylamine, N-phenyl-N-methacryloylamine, diallylamine, and vinylimidazole.

16. The liquid crystalline polyester resin composition according to claim 1, wherein the primary amines and secondary amines are selected from the group consisting of allylamine, diallylamine and vinylimidazole.

17. The liquid crystalline polyester resin composition according to claim 10, wherein said polyphenylene ether (A) which is modified is selected from the group consisting of a polymer of 2,6-dimethylphenol, a polymer of 2,6-diphenylphenol, a copolymer of 2,6-dimethylphenol and 3-methyl-6-tert.-butylphenol, and a copolymer of 2,6-dimethylphenol and 2,3,6-trimethylphenol.

18. The liquid crystalline polyester resin composition according to claim 10, wherein said polyphenylene ether (A) which is modified is 2,6-dimethylphenol.

19. The liquid crystalline polyester resin composition according to claim 10, wherein the primary amines and secondary amines are selected from the group consisting of allylamine, allylaniline, N-acryloylamine, N-methacryloylamine, N-phenyl-N-methacryloylamine, diallylamine, and vinylimidazole.

20. The liquid crystalline polyester resin composition according to claim 10, wherein the primary amines and secondary amines are selected from the group consisting of allylamine, diallylamine and vinylimidazole.

* * * * *